United States Patent
Ishimori et al.

(10) Patent No.: US 9,069,078 B2
(45) Date of Patent: Jun. 30, 2015

(54) RADAR DEVICE

(75) Inventors: Hiroyuki Ishimori, Kobe (JP); Hideki Kajioka, Kobe (JP); Shinichi Shibata, Kobe (JP)

(73) Assignee: FUJITSU TEN LIMITED, Hyogo (JP)

( * ) Notice: Subject to any disclaimer, the term of this patent is extended or adjusted under 35 U.S.C. 154(b) by 558 days.

(21) Appl. No.: 13/365,542

(22) Filed: Feb. 3, 2012

(65) Prior Publication Data
US 2012/0200450 A1    Aug. 9, 2012

(30) Foreign Application Priority Data
Feb. 7, 2011    (JP) ................. 2011-024126

(51) Int. Cl.
    *G01S 13/93*    (2006.01)
(52) U.S. Cl.
    CPC ....... *G01S 13/931* (2013.01); *G01S 2013/9321* (2013.01); *G01S 2013/9325* (2013.01)
(58) Field of Classification Search
    CPC .......... G01S 13/931; G01S 2013/9321; G01S 2013/9325
    USPC ...................................... 342/70–72
    See application file for complete search history.

(56) References Cited

U.S. PATENT DOCUMENTS

| | | | |
|---|---|---|---|
| 5,806,019 A * | 9/1998 | Ishiyama | 701/300 |
| 6,518,916 B1 | 2/2003 | Ashihara et al. | |
| 6,888,622 B2 * | 5/2005 | Shimomura | 356/4.01 |
| 7,224,309 B2 * | 5/2007 | Shimomura | 342/70 |
| 7,509,217 B2 * | 3/2009 | Endoh | 701/300 |
| 2007/0032953 A1 | 2/2007 | Samukawa et al. | |

FOREIGN PATENT DOCUMENTS

JP    A-2010-32429    2/2010

OTHER PUBLICATIONS

May 14, 2012 Extended European Search Report issued in European Patent Application No. 12154047.0.
Nov. 11, 2014 Office Action issued in Japanese Application No. 2011-024126.

* cited by examiner

*Primary Examiner* — Matthew M Barker
(74) *Attorney, Agent, or Firm* — Oliff PLC

(57) ABSTRACT

A radar device (10) comprising a transmission antenna (14) for transmitting electromagnetic waves; a reception antenna (15) for receiving waves; and a detector unit (34) which detects, based on the reflected waves, the positions of a preceding vehicle and a preceding object, judges the preceding object to be the same as the preceding vehicle if the position of the preceding object is in a predetermined preceding vehicle judging range with the position of the preceding vehicle as a reference, detects the positions of an oncoming vehicle and an oncoming object and judges the oncoming object to be the same as the oncoming vehicle if the position of the oncoming object is in a predetermined oncoming vehicle judging range with the position of the oncoming vehicle as a reference; wherein the oncoming vehicle judging range is set to be narrower than the preceding vehicle judging range.

4 Claims, 18 Drawing Sheets

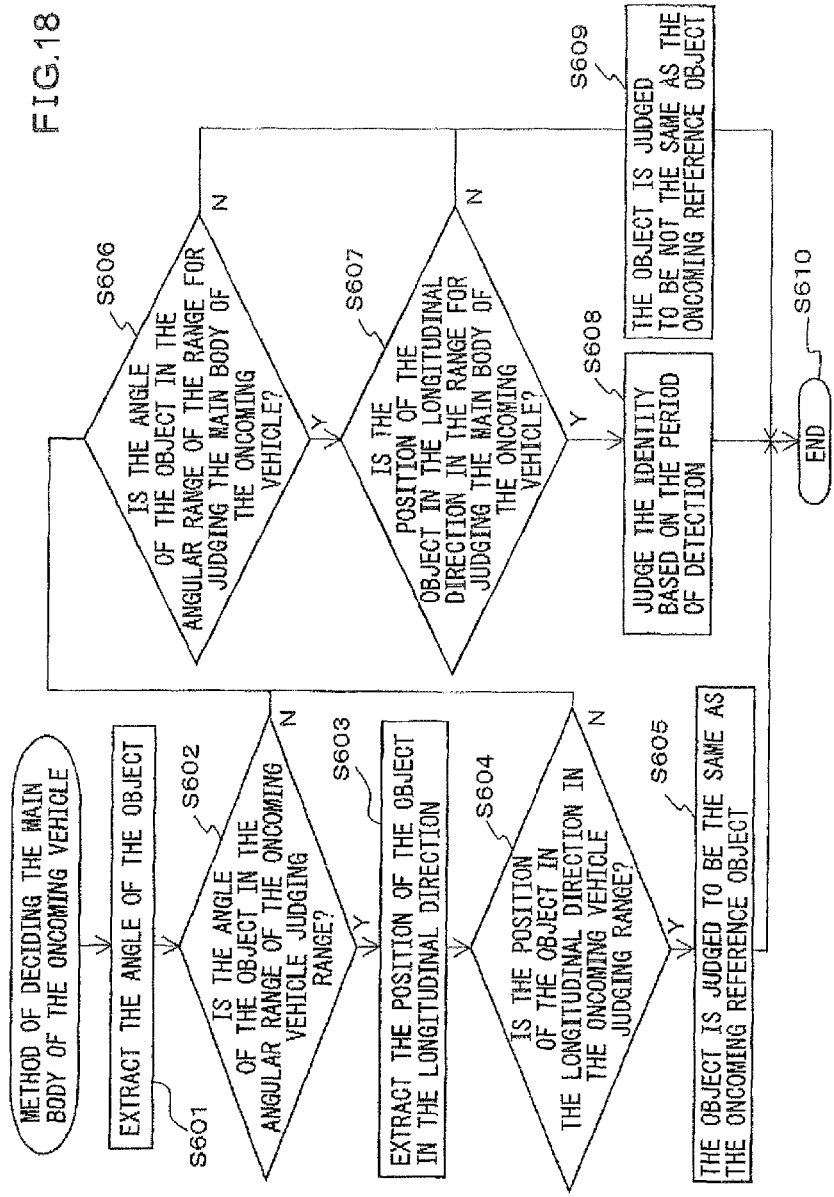

RADAR DEVICE

CROSS REFERENCES TO RELATED APPLICATIONS

This application is a new U.S. patent application that claims benefit of JP 2011-024126, filed on Feb. 7, 2011, the content of 2011-024126 being incorporated herein by reference.

BACKGROUND OF THE INVENTION

1. Field of the Invention

This invention relates to a radar device and, specifically, to a radar device mounted on a vehicle and for detecting the positions of preceding vehicles and oncoming vehicles as viewed from the vehicle.

2. Description of Related Art

As a device for detecting objects by using a radar device, an object detector for correctly detecting objects has been reported (e.g., see patent document 1). As shown in FIG. 1, an object detector unit 140 in a conventional object detector 110 includes a grouping means 141 for grouping a plurality of detection point data corresponding to an object from a plurality of detection point data, a partial searching means 142 for searching and detecting a predetermined portion of the object to be detected from an image portion corresponding to the detection point data grouped by the grouping means, a straight line calculation means 143 for calculating two straight lines extending from the object detector unit 140 up to both ends of a portion detected by the partial searching means 142, and a detection point extraction means 144 for extracting, as detection point data corresponding to a portion of the object to be detected, the detection point data on the insides of the two straight lines calculated by the straight line calculation means 143 out of the detection point data grouped by the grouping means 141. The object detector unit 140 also includes an end point estimating means 145 and a state estimating means 146. The conventional object detector 110 also includes a camera 120 and a laser radar 130, and the conventional object detector 110 is connected with a braking unit 150.

The above constitution makes it possible to correctly detect objects by using the radar.

As technologies for a radar, an ACC (Adaptive Cruise Control System) and a CMBS (Collision Mitigation Brake System) have also been known. ACC makes it possible to travel (hereinafter referred to as "preceding vehicle") ahead of a vehicle that has the ACC. The CMBS makes it possible to prevent a collision by automatically applying the brakes if the distance becomes short with respect to the preceding vehicle. The ACC and the CMBS must correctly grasp the positions of the preceding vehicles. A vehicle is usually provided with side mirrors, and electromagnetic waves transmitted from the radar device toward the preceding vehicle are reflected not only by the rear of the preceding vehicle but also by the side mirrors. Therefore, the objects detected based on the waves reflected by the side mirrors are recognized as objects different from the preceding vehicle which is equipped with side mirrors. Namely, a single preceding vehicle forms a plurality of objects, and capacity of a memory often becomes insufficient to store the data of the objects. In order to solve this problem, a "mirror judgment processing" has been developed.

The "mirror judgment processing" is a process for determining objects detected based on the waves reflected by side mirrors as objects that are based on a preceding vehicle equipped with the side mirrors. According to the mirror judgment processing, a predetermined range is set with the positions of the detected objects of the preceding vehicle as references, the objects detected within the range are assumed to be based on the preceding vehicle, and the data of only one object are representatively processed.

The mirror judgment processing will now be concretely described with reference to FIG. 2 which is a view looking down the lanes on where the vehicles are traveling. A vehicle 100 equipped with a radar device 10 is traveling on a lane 300 located on a left side of a halfway line 600 heading in the direction of arrow "a". On the lane 300 it is presumed that a first preceding vehicle 101 is traveling heading in the direction of arrow "b" which is the same direction as arrow "a" ahead of the vehicle 100. Electromagnetic waves emitted from the radar device 10 toward the first preceding vehicle 101 are reflected by the rear of the first preceding vehicle 101. Therefore, the position of an object $T_0$ that is detected becomes the rear of the first preceding vehicle 101.

It is presumed that the first preceding vehicle 101 is provided with mirrors (side mirrors) on both sides of the vehicle body. Electromagnetic waves emitted from the radar device 10 are reflected by the mirrors. The intensity of the electromagnetic waves reflected by the mirrors is high enough to detect objects $T_1$ and $T_2$. If the data of the detected objects $T_1$ and $T_2$ are stored together with the data of the object $T_0$ of the first preceding vehicle 101, then the data of the three objects must be stored for one preceding vehicle. The maximum number of objects that the radar device is capable of storing is about 10, and it is not desired to store three objects per a vehicle. Therefore, in the mirror judgment processing, the objects $T_1$ and $T_2$ detected by being reflected by the mirrors are regarded to be based on the first preceding vehicle 101, and the data of the object $T_0$ of the first preceding vehicle 101 are representatively processed.

In the mirror judgment processing as shown in FIG. 2, objects are regarded to be the same as the object $T_0$ if they are detected in a predetermined range with the position of the object $T_0$ of the first preceding vehicle 101 as a reference, e.g., if they are detected in a range $A_1$ of $\pm d_{x0}$ in the transverse direction and $d_{y0}$ in the longitudinal direction as viewed from the vehicle 100 with the position of the object $T_0$ as a reference. For instance, the width $2d_{x0}$ in the transverse direction is 2.5 [m]. Hereinafter, the predetermined range which is regarded to be the same as the preceding vehicle is referred to as "preceding vehicle judging range". Upon setting the preceding vehicle judging range in a range inclusive of the mirrors of the vehicle, the objects based on the reflection by the mirrors of the preceding vehicle can be regarded to be the same as the preceding vehicle, and the number of the data to be processed by the radar device can be brought into conformity with the number of the preceding vehicles.

The conventional mirror judgment processing is used for detecting a preceding vehicle traveling in the same direction as the present vehicle equipped with the radar device. On the other hand, in order to avoid collision of the present vehicle with other vehicles which approaches to the present, it is important to correctly detect the positions of the vehicles (hereinafter referred to as "oncoming vehicles"). In particular, the oncoming vehicles rapidly approaching the present vehicle and, therefore, it is desired to correctly detect the position of the oncoming vehicles within a short period of time. If the conventional mirror judging processing is used for detecting the oncoming vehicles, however, there remains a problem in that the positions of the oncoming vehicles cannot be correctly detected as described below.

Referring to FIG. 2, it is presumed that a first oncoming vehicle 201 and a second oncoming vehicle 202 are traveling on an opposite lane 400 in the directions of arrow $c_1$ and $c_2$ which are opposite to the direction in which the present vehicle 100 is traveling, and the positions of the detected objects are $T_{f1}$ and $T_{f2}$. If the mirror judgment processing is executed for the oncoming vehicles by setting the preceding vehicle judging range which is of the same size as the preceding vehicle, the objects can be regarded to be the same as the reference object $T_{f1}$ if they are detected in a range $A_1'$ of $\pm d_{x0}$ in the transverse direction and $d_{y0}$ in the longitudinal direction with the position of the object $T_{f1}$ as a reference. If a distance (transverse positional difference) $d_x$ between $T_{f1}$ and $T_{f2}$ in the transverse direction is smaller than $d_{x0}$ and if a distance (longitudinal positional difference) $d_y$ in the longitudinal direction is smaller than $d_{y0}$, however, the position of $T_{f2}$ is included in the range $A_1'$—Therefore, the second oncoming vehicle 202 is judged to be the same as the first oncoming vehicle 201 by the mirror judgment processing, and the position of the second oncoming vehicle 202 can no longer be grasped. This results in a delay in starting operation for avoiding the collision when the second oncoming vehicle 202 approaches the present vehicle 100.

As described above, if the conventional mirror judgment processing is used for detecting the oncoming vehicles, a problem occurs, i.e., the positions of the oncoming vehicles are not correctly detected.

[Patent document 1] JP-A-2010-32429

SUMMARY OF THE INVENTION

A first object is to provide a radar device capable of correctly distinguishing oncoming vehicles and oncoming objects that are traveling in a direction opposite to the direction in which the present vehicle is traveling.

A second object is to provide a radar device capable of distinguishing, in a short period of time, oncoming vehicles and the oncoming objects that are traveling in a direction opposite to the direction in which the present vehicle is traveling.

A third object is to provide a radar device capable of instantaneously distinguishing oncoming vehicles and oncoming objects when the distances are greater than a predetermined distance between oncoming vehicles and oncoming objects that are traveling in a direction opposite to the direction in which the present vehicle is traveling.

The radar device comprises a transmission antenna for transmitting electromagnetic waves to an object; a reception antenna for receiving waves reflected by the object; and a detector unit which detects, based on the reflected waves, the positions of a preceding vehicle and a preceding object traveling in a direction same as the direction in which the present vehicle is traveling, judges the preceding object to be the same as the preceding vehicle if the position of the preceding object is in a predetermined preceding vehicle judging range with the position of the preceding vehicle as a reference, detects, based on the reflected waves, the positions of an oncoming vehicle and an oncoming object traveling in a direction opposite to the direction in which the present vehicle is traveling, and judges oncoming object to be the same as the oncoming vehicle if the position of the oncoming object is in a predetermined oncoming vehicle judging range with the position of the oncoming vehicle as a reference; wherein the oncoming vehicle judging range is set to be narrower than the preceding vehicle judging range.

The above radar device has an advantage of quickly detecting a plurality of oncoming vehicles traveling in parallel as separate vehicles.

BRIEF DESCRIPTION OF THE DRAWINGS

These and other features and advantages of the present invention will be better understood by reading the following detailed description, taken together with the drawings wherein:

FIG. 18 is a flowchart illustrating another method of detecting the oncoming vehicle by using the another radar device 19.

DETAILED DESCRIPTION OF THE PREFERRED EMBODIMENTS

The radar device will now be described with reference to the drawings. It should, however, be noted that the technical scope of the invention is not limited to these embodiments only but encompasses the inventions described in the claims as well as equivalents thereof.

Figure 1:
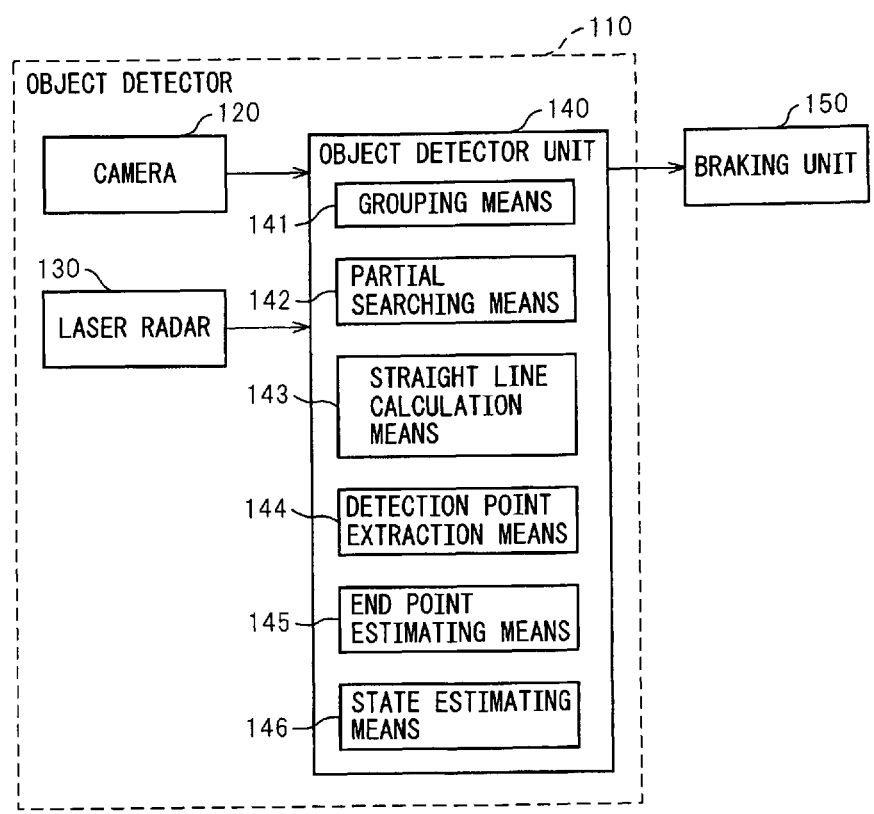
FIG. 1 is a diagram of the constitution of a conventional object detector.
Figure 2:
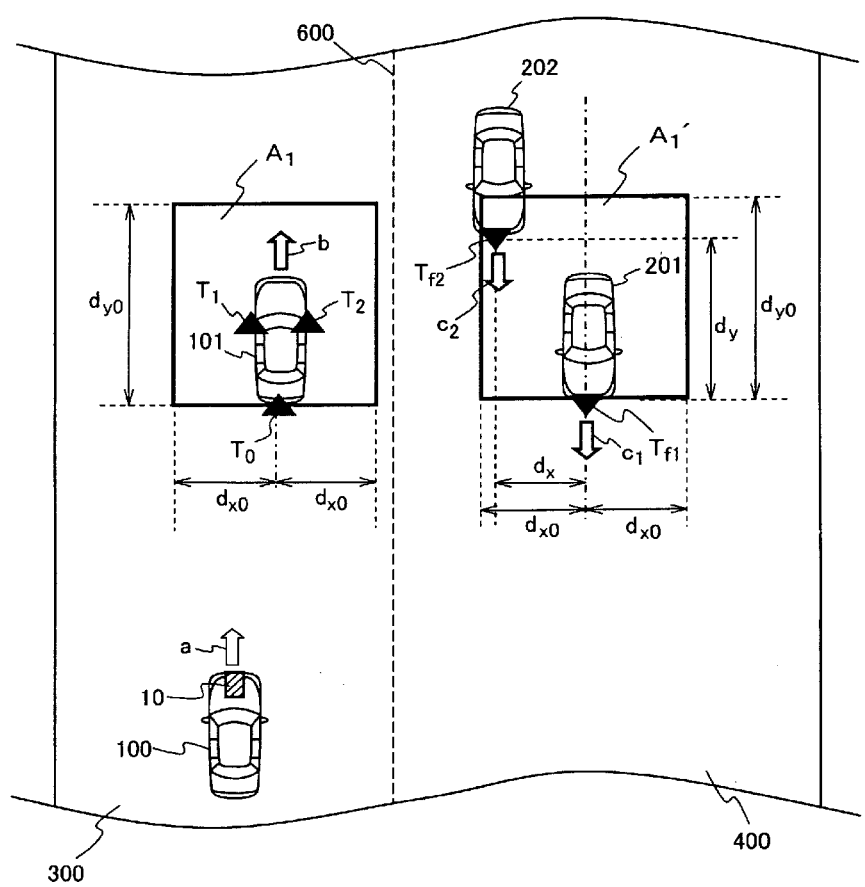
FIG. 2 is a view showing a scene for detecting preceding vehicles and oncoming vehicles by using a radar device.
Figure 3:
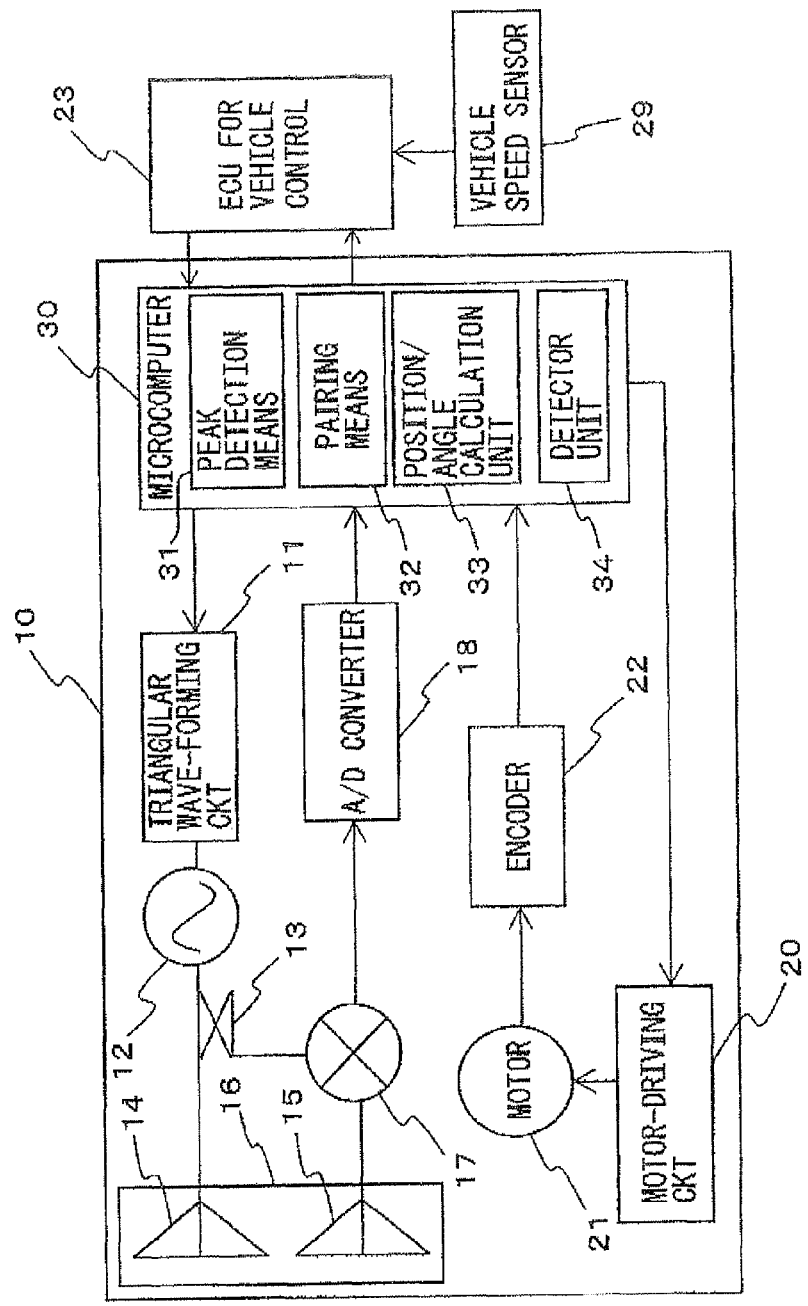
FIG. 3 is a diagram of the constitution of the radar device 10.

First, the radar device 10 will be described with reference to the drawings. FIG. 3 is a diagram of the constitution of the radar device 10. The radar device 10 has a feature in that a detector unit 34 is provided in a microcomputer 30. In the radar device 10 described below, a mechanical scanning system is employed for driving the antenna. FM signals are fed from a triangular wave-forming circuit 11 to a voltage-controlled oscillator (VCO) 12, and waves are transmitted from a transmission antenna 14 toward the front of the vehicle. The waves reflected by an object in front of the vehicle are received by a reception antenna 15, and the reflected waves and the transmitted waves are passed through a directional coupler 13 and are mixed together in a mixer 17 to obtain beat signals. The beat signals are subjected to the A/D conversion through an A/D converter 18 and are input to the microcomputer 30. By using peak data detected by a peak detection means 31 from the beat signals, a pairing means 32 detects the object, and a position/angle calculation unit 33 calculates a relative distance, a relative speed and an angle between the present vehicle and the object. The radar device 10 is connected to an ECU (Electronic Control Unit) for vehicle control 23 and exchanges information with the ECU for vehicle control 23. A vehicle speed sensor 29 is connected with the ECU for vehicle control 23 for obtaining data of a vehicle speed.

The transmission antenna 14 and the reception antenna 15 are disposed in an antenna unit 16 and deflected right and left so as to detect objects in a predetermined angular range, the transmission antenna 14 and the reception antenna 15 being driven by a motor 21 controlled by a motor drive circuit 20 so as to face in the same direction. The state of driving the motor 21 is controlled by feedback, i.e., by inputting the signals from the motor 21 to the microcomputer 30 through an encoder 22 to thereby control the angular range of the antenna and the period thereof.

Figure 8:
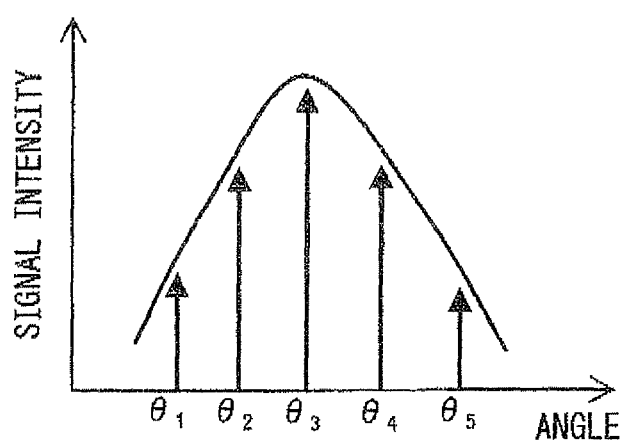
FIG. 8 is a diagram showing the signal intensities of the reflected waves depending upon the angle.

As shown in FIG. 8, the intensities of the received signals are measured while varying the angle like $\theta_1, \theta_2, \ldots, \theta_5$, by deflecting the transmission antenna in a horizontal direction, and an angle ($\theta_3$ in the example of FIG. 8) at which a peak signal intensity is obtained is detected as the angle at which the object is present.

Figure 4:
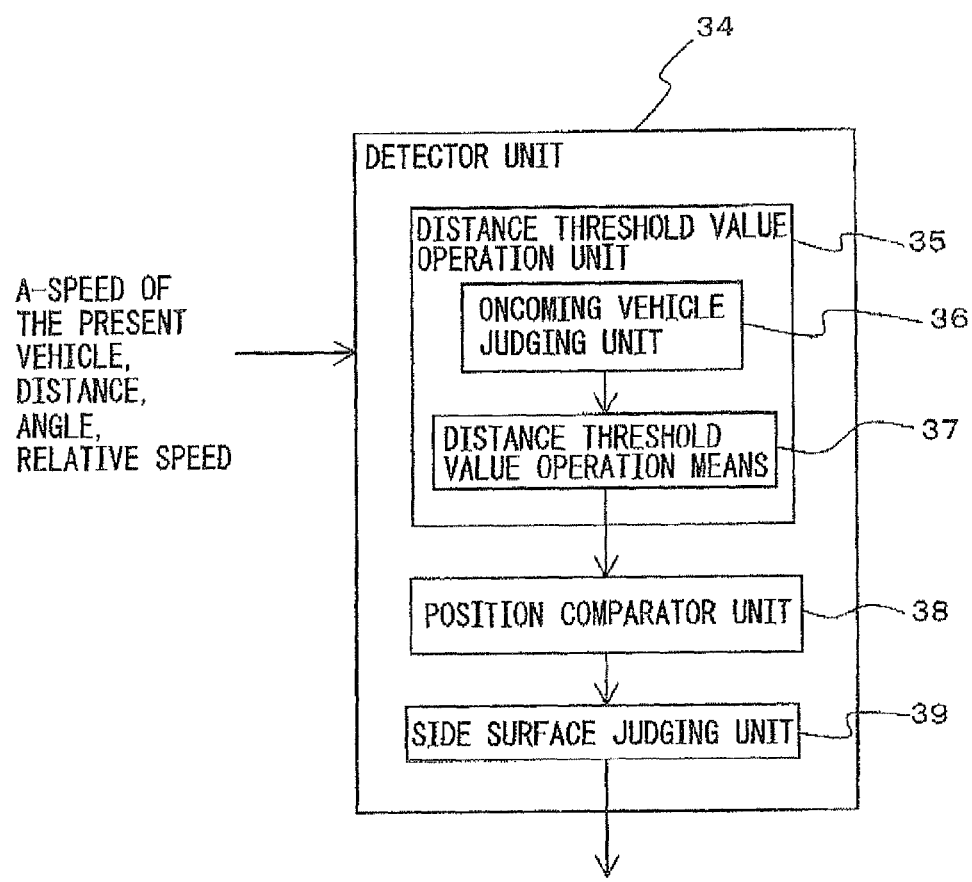
FIG. 4 is a diagram of the constitution of a detector unit 34 in the radar device 10.

Next, the detector unit 34 in the radar device will be described with reference to the drawings. Referring to FIG. 4, the detector unit 34 in the radar device 10 includes
 a distance threshold value operation unit 35,
 a position comparator unit 38 and
 a side surface judging unit 39.
The distance threshold value operation unit 35 includes
 an oncoming vehicle judging unit 36 and
 a distance threshold value operation means 37.

From the detected position and the relative speed, the oncoming vehicle judging unit 36 judges if the object is a preceding vehicle or an oncoming vehicle. Depending upon if the detected object is the preceding vehicle or the oncoming vehicle, the distance threshold value operation means 37 calculates threshold values related to the distance for determining the preceding vehicle judging range or the oncoming vehicle judging range. From the distance and angle of the detected object, the position comparator unit 38 judges if the object is present in the preceding vehicle judging range or the oncoming vehicle judging range. Depending upon if the detected object is present in the preceding vehicle judging range or the oncoming vehicle judging range, the side surface judging unit 39 judges the identity between the object to be detected and the object of the detected preceding vehicle or the oncoming vehicle. The radar device 10 has a feature in that the oncoming vehicle judging range is set to be narrower than the preceding vehicle judging range.

Figure 5:
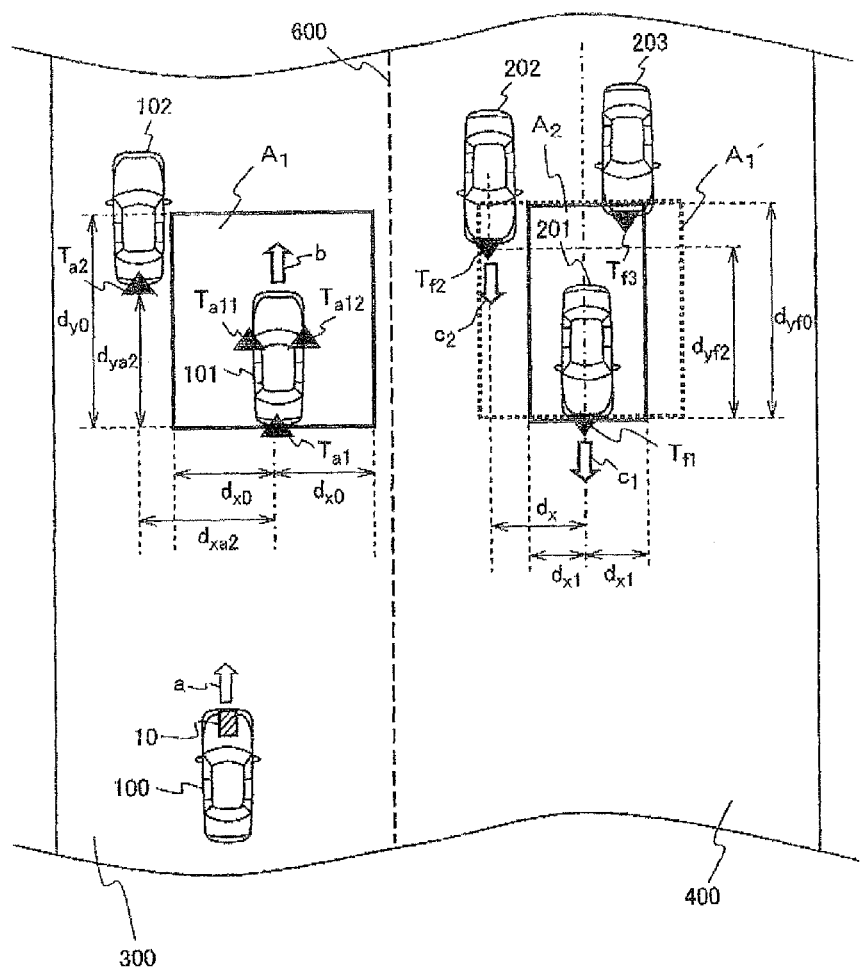
FIG. 5 is a bird's-eye view of vehicles for illustrating a method of detecting preceding vehicles and oncoming vehicles by using the radar device 10.

Referring, next, to FIG. 5, described below is a method of detecting the preceding vehicle by using the radar device 10. FIG. 5 is a view showing a scene for detecting the preceding vehicles, and looks down the vehicles traveling on a motorway from the upper side. It is presumed that the present vehicle 100 mounting the radar device 10 is traveling on a lane 300 in the direction of arrow "a" at a speed of 60 [km/h] and that a first preceding vehicle 101 and a second preceding vehicle 102 are also traveling on the lane 300 in the direction of arrow "b" at a speed of 40 [km/h]. FIG. 5, further, shows a first oncoming vehicle 201 and a second oncoming vehicle 202 traveling on an opposite lane 400.

Figure 6:
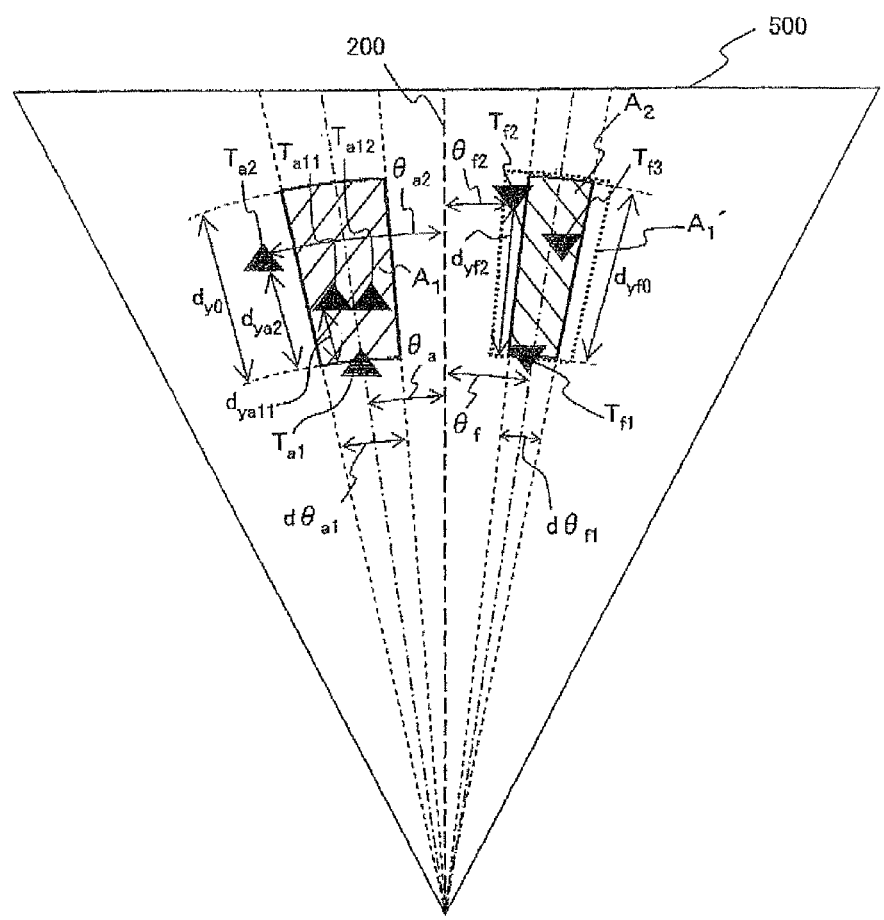
FIG. 6 is a view showing the results detected by the radar device 10 and illustrates the method of detecting preceding vehicles and oncoming vehicles by using the radar device.

The radar device 10 will transmit electromagnetic waves to the first preceding vehicle 101 and the second preceding vehicle 102, and objects $T_{a1}$, $T_{a11}$, $T_{a12}$ and $T_{a2}$ may be detected from the reflected waves. Then, the detected results are recognized by the radar device as shown in FIG. 6. In practice, the object will be detected from the mirrors of the second preceding vehicle 102, too, which, however, is omitted here for simplifying the description. FIG. 6 is a view showing the positions of the objects detected by the radar device, wherein, in a display region 500, the direction of an angle 0 with the present vehicle as a reference is represented by a reference line 200, and marks of objects (upwardly facing triangles or downwardly facing triangles) are plotted depending upon the positions and angles of the objects.

Figure 7:
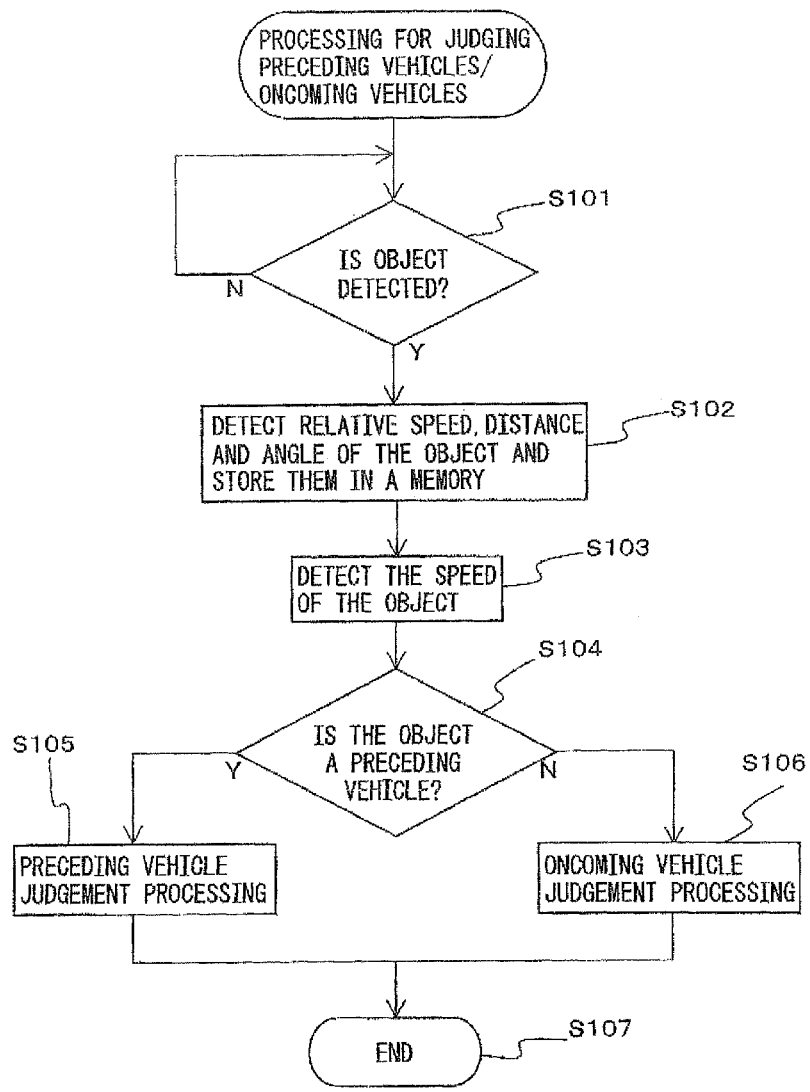
FIG. 7 is a flowchart illustrating a procedure for judging if the object is a preceding vehicle or an oncoming vehicle by using the radar device 10.

Described below is a method of detecting the objects by using the radar device 10. It is, first, judged if the objects detected by the radar device 10 are preceding vehicles or oncoming vehicles. The judgment processing is carried out as the oncoming vehicle judging unit 36 executes a program stored in a memory (not shown) in the microcomputer 30. FIG. 7 is a flowchart of a processing procedure for judging if the object is a preceding vehicle or an oncoming vehicle. At step S101, first, it is judged if the radar device 10 has detected an object. If the object is detected can be judged based on the reflected waves in which the signals exhibit a peak at a certain angle as shown in FIG. 8. If no object is detected, detection of an object is tried again at step S101. If an object is detected, a relative speed of the object, a distance and an angle are detected at step S102, and are stored in a memory (not shown). The relative speed and distance of the object can be detected by the FM-CM wave peak detection means 31 and the pairing means 32 (see FIG. 3). On the other hand, the angle of the object can be found from the angle of the peak in the reflected waves. In the example of FIG. 8, peaks are detected at a plurality of angles $\theta_1$ to $\theta_5$ and among them, the angle is $\theta_3$ at which the peak becomes a maximum. Therefore, the angle at which the object is present is found to be $\theta_3$. The position of the object can be found from the detected distance and angle.

Next, at step S103, the speed of the object is calculated. Concretely, the speed is calculated from the relative speed of the object and the speed of the present vehicle. Next, from the speed of the object and the speed of the present vehicle, it is judged at step S104 if the detected object is the preceding vehicle. As shown in FIG. 5, for example, if the object $T_{a1}$ is approaching the present vehicle 100 at a relative speed of 20 [km/h] while the present vehicle 100 is traveling at a speed of 60 [km/h], it can be judged that the object $T_{a1}$ is traveling at a speed of 40 [km/h] in the same direction as the present vehicle 100 and, therefore, that the object $T_{a1}$ is the one based on the preceding vehicle. If the detected object is an object (preceding object) that is traveling ahead of the present vehicle, the preceding vehicle judgment processing is executed at step S105. If the detected object is an object (oncoming object) traveling in the direction opposite to the present vehicle, on the other hand, the oncoming vehicle judgment processing is executed at step S106.

Next, the preceding vehicle judgment processing will be described with reference to a flowchart of FIG. 9. The preceding vehicle judgment processing is carried out by executing a program stored in the memory (not shown) in the detector unit 34. It is assumed here that a plurality of objects are detected that are traveling in the same direction as the present vehicle. At step S201, first, the distance threshold value operation means 37 judges if the objects judged to be the preceding vehicles are the objects present at positions closest to the present vehicle. If the object to be detected is the object present at a position closest to the present vehicle, the distance threshold value operation means 37 at step S202 judges the object to be detected as the preceding reference object. The preceding reference object is an object that serves as a reference for determining a range in which the identity is judged between the objects (objects to be detected) that are detected in addition to the preceding reference object and the preceding reference object. The object present at the position closest to the present vehicle is regarded as the preceding reference object because the preceding vehicle closest to the present vehicle is most probable to collide with the present vehicle.

Next, at step S203, the distance threshold value operation means 37 calculates an angular range of the preceding vehicle judging range. The preceding vehicle judging range is a range in which the identity is judged between the object to be detected and the preceding reference object. Concretely, as shown in FIG. 6, first, a predetermined range $d\theta_{a1}$ in the transverse direction is determined based on the angle $\theta_a$ of the preceding reference object. Referring to FIG. 5, if the preceding vehicle judging range $A_1$ is set to cover the ranges of $+d_{x0}$ (and $-d_{x0}$ in the transverse direction with the preceding reference object $T_{a1}$ as a reference, an angle $d\theta_{a1}$, corresponding to the range $2d_{x0}$ in the transverse direction is calculated as follows:

$$d\theta_{a1} = 2\sin^{-1}(d_{x0})/x_{a1} \quad (1)$$

where $x_{a1}$ is a distance from the present vehicle 100 up to the preceding reference object $T_{a1}$.

The width $2d_{x0}$ of the preceding vehicle judging range $A_1$ in the transverse direction is, for example, 1.8 [m].

Next, at step S204, the distance threshold value operation means 37 determines the preceding vehicle judging range $A_1$ in the longitudinal direction. The range in the longitudinal direction is from the position of the preceding reference object $T_{a1}$ up to a predetermined distance $d_{y0}$ in the traveling direction. The preceding vehicle judging range $A_1$ in FIG. 6 is represented by a hatched range. The range $d_{y0}$ in the longitudinal direction may be set depending upon the speed of the preceding reference object $T_{a1}$. That is, when the speed of the preceding reference object $T_{a1}$ is large, the range $d_{y0}$ is set to be large in the longitudinal direction and when the speed of the preceding reference object $T_{a1}$ is small, the range $d_{y0}$ is set to be small in the longitudinal direction. This makes it possible to properly set the preceding vehicle judging range depending upon the speed of the preceding reference object.

At step S201, if it is so judged that the object to be detected is not the object closest to the radar device, then the identity is judged between the object to be detected and the preceding reference object by examining if the object to be detected is present in the predetermined preceding vehicle judging range with the preceding reference object as a reference. First, the position comparator unit 38 at step S205 extracts the angle of the object to be detected from the memory (not shown) that is storing the data in advance (see S102 in FIG. 7), and at step S206 judges if the angle of the object to be detected is in the preceding vehicle judging range $A_1$. As shown in FIG. 6, for example, it will be learned that the angle $\theta_{a2}$ of the object $T_{a2}$ to be detected is $\theta_{a2} > \theta_a + d\theta_{a1}/2$. As a result, it is judged that the object $T_{a2}$ to be detected is not present in the preceding vehicle judging range $A_1$. At step S210, therefore, the side surface judging unit 39 judges that the object $T_{a2}$ to be detected is not the same as the preceding reference object.

When the object to be detected is $T_{a11}$, it is judged that the angle of the object to be detected is in the preceding vehicle judging range $A_1$ if the angle $\theta_{a11}$ thereof is in a range satisfying the following formula, $$\theta_a - d\theta_{a1}/2 \leq \theta_{a11} \leq \theta_a + d\theta_{a1}/2 \quad (2)$$

In this case, the position comparator unit 38 at step S207 extracts the position $d_{ya11}$ of the object $T_{a11}$ in the longitudinal direction from the memory (not shown) storing the data in advance (S102 in FIG. 7), and judges at step S208 if the position of the object $T_{a11}$ in the longitudinal direction is in the preceding vehicle judging range $A_1$. If the position $d_{ya11}$ of the object $T_{a11}$ in the longitudinal direction satisfies the following formula, then it is judged that the position of the object $T_{a11}$ in the longitudinal direction is in the preceding vehicle judging range $A_1$.

$$0 \leq d_{ya11} \leq d_{y0} \quad (3)$$

Figure 9:
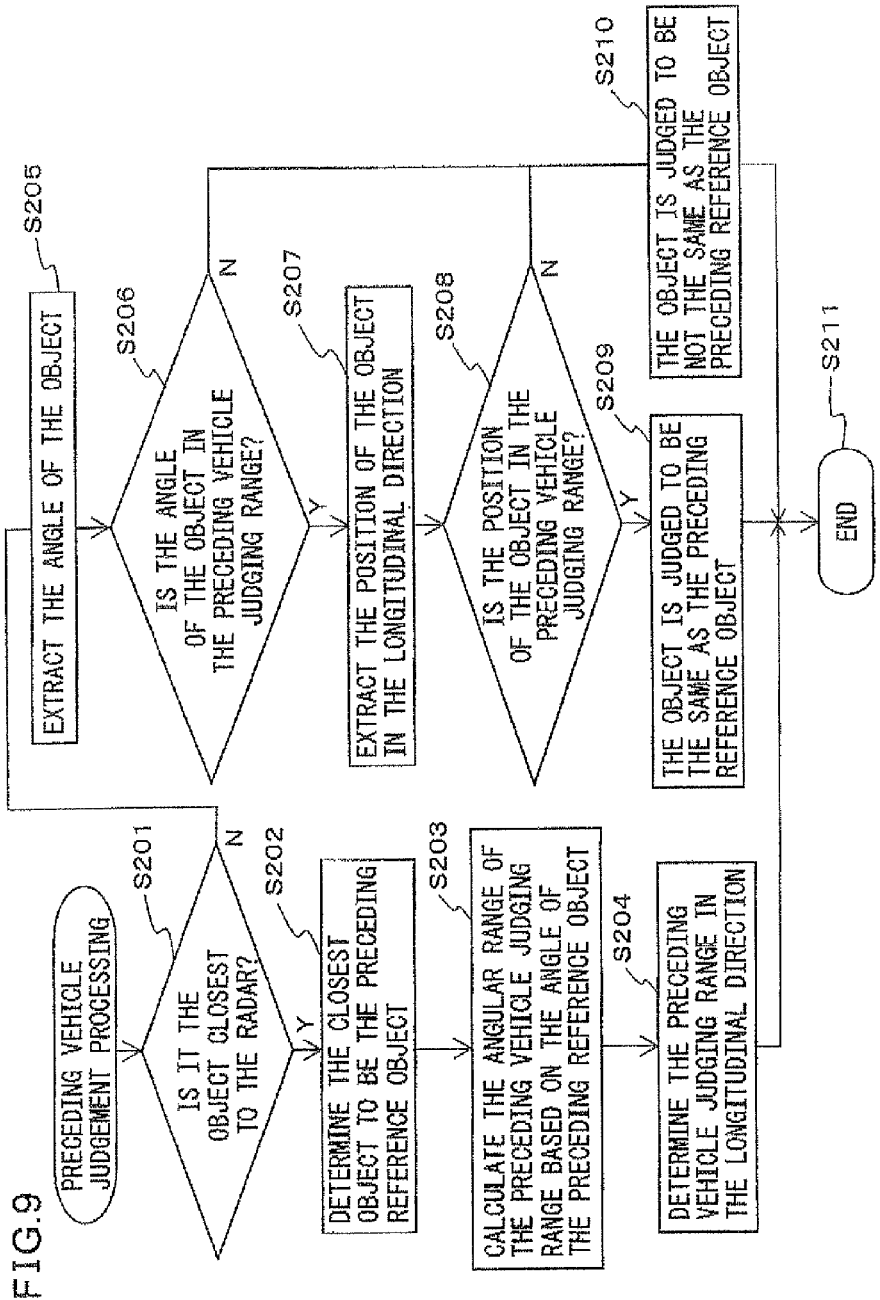
FIG. 9 is a flowchart illustrating a method of detecting the preceding vehicle by using the radar device 10.

When the position of the object $T_{a11}$ in the longitudinal direction is in the preceding vehicle judging range $A_1$, the side surface judging unit 39 at step S209 judges that the object $T_{a11}$ is the same as the preceding reference object and the preceding vehicle judgment processing in FIG. 9 ends at step S211.

In the example shown in FIGS. 5 and 6, of the objects $T_{a2}$ and $T_{a11}$, the object $T_{a2}$ is present outside of the preceding vehicle judging range $A_1$ and is judged to be an object separate from the object $T_{a1}$ which is the preceding vehicle, while the object $T_{a11}$ is present in the preceding vehicle judging range $A_1$ and is judged to be the object the same as the object $T_{a1}$ which is the preceding vehicle. As shown in FIGS. 5 and 6, the object $T_{a12}$, too, is present in the preceding vehicle judging range $A_1$ and is judged to be the object the same as the object $T_{a1}$ which is the preceding vehicle. As a result, the objects $T_{a11}$ and $T_{a12}$ are not regarded as the object to be processed, and the data of the object $T_{a1}$ are representatively processed.

Next, described below is a method of detecting an object approaching the present vehicle. When the detected object is approaching the present vehicle at step S104 in a flowchart of FIG. 7, the oncoming vehicle judging unit 36 judges that the object is an oncoming vehicle, and an oncoming vehicle-judging processing is executed at step S106. The oncoming vehicle judging processing will be described with reference to a flowchart of FIG. 10. The oncoming vehicle judging processing is carried out by executing a program stored in the memory (not shown) in the detector unit 34. At step S301, first, the distance threshold value operation means 37 judges if the object judged to be the oncoming vehicle is an object present at a position closest to the present vehicle. If the detected object is the object present at the position closest to the present vehicle, the distance threshold value operation means 37 at step S302 determines the detected object to be the oncoming reference object. The object present at the position closest to the present vehicle is used as a reference because of the reason that the oncoming vehicle closest the present vehicle has the highest probability of collision with the present vehicle.

Next, at step S303, the distance threshold value operation means 37 determines an angular range of the oncoming vehicle judging range. The oncoming vehicle judging range is a range for judging the identity between the object and the oncoming reference object. Concretely, as shown in FIG. 6, first, a predetermined range $d\theta_{f1}$ is determined in the transverse direction based on the angle $\theta_f$ of the oncoming reference object $T_{f1}$. Referring to FIG. 5, if the oncoming vehicle judging range $A_2$ is set to cover the range of $\pm d_{x1}$ in the transverse direction with the oncoming reference object $T_{f1}$ as a reference, an angle $d\theta_{f1}$ corresponding to the range $2d_{x1}$ in the transverse direction is calculated as follows:

$$d\theta_{f1} = 2\sin^{-1}(d_{x1})/x_{f1} \quad (4)$$

where $x_{f1}$ is a distance from the present vehicle 100 up to the oncoming reference object $T_{f1}$.

Next, at step S304, the distance threshold value operation means 37 determines the oncoming vehicle judging range $A_2$ in the longitudinal direction. The range in the longitudinal direction is from the position of the oncoming reference object $T_{f1}$ up to a predetermined distance $d_{yf0}$ in the direction in which the present vehicle is traveling. The oncoming vehicle judging range $A_2$ in FIG. 6 is represented by a hatched range. The range $d_{yf0}$ in the longitudinal direction may be set depending upon the speed of the oncoming reference object $T_{f1}$. That is, when the speed of the oncoming reference object $T_{f1}$ is large, the range $d_{yf0}$ is set to be large in the longitudinal direction and when the speed of the oncoming reference object $T_{f1}$ is small, the range $d_{yf0}$ is set to be small in the longitudinal direction. This makes it possible to properly set the oncoming vehicle judging range depending upon the speed of the oncoming reference object.

The radar device 10 has a feature in that the oncoming vehicle judging range $A_2$ is set to be narrower than the preceding vehicle judging range $A_1$. Concretely, as shown in FIG. 5, for example, if the distance in the transverse direction for specifying the preceding vehicle judging range $A_1$ is denoted by $d_{x0}$ and the distance in the transverse direction for specifying the oncoming vehicle judging range $A_2$ is denoted by $d_{x1}$, then the preceding vehicle judging range $A_1$ and the oncoming vehicle judging range $A_2$ are so set that $d_{x1} < d_{x0}$.

At step S301, if it is so judged that the object is not an object closest to the radar device, then the identity is judged between the object and the oncoming reference object by examining if the object is present in the predetermined oncoming vehicle judging range with the oncoming reference object as a reference. First, the position comparator unit 38 at step S305 extracts the angle of the object from the memory (not shown) that is storing the data in advance (see S102 in FIG. 7), and at step S306 judges if the angle of the object is in the oncoming vehicle judging range. As shown in FIG. 6, for example, it will be learned that the angle $\theta_{f2}$ of the object $T_{f2}$ is $\theta_{f2} < \theta_f - d\theta_{f1}/2$. As a result, it is judged that the object $T_{f2}$ is not present in the oncoming vehicle judging range $A_2$. At step S310, therefore, the side surface judging unit 39 judges that the object $T_{f2}$ is not the same as the oncoming reference object $T_{f1}$.

When the object is a third oncoming vehicle 203 and is denoted by $T_{f3}$, it is decided that the angle $\theta_{f3}$ of the object is in the oncoming vehicle judging range $A_2$ if the angle thereof is in a range satisfying the following formula, $$\theta_f - d\theta_{f1}/2 \leq \theta_{f3} \leq \theta_f + d\theta_{f1}/2 \quad (5)$$

In this case, the position comparator unit 38 at step S307 extracts the position $d_{yf3}$ of the object $T_{f3}$ in the longitudinal direction from the memory (not shown) storing the data in advance (S102 in FIG. 7), and judges at step S308 if the position $d_{yf3}$ of the object To in the longitudinal direction is in the oncoming vehicle judging range $A_2$. If the position $d_{yf3}$ (not shown) of the object $T_{f3}$ in the longitudinal direction satisfies the following formula, then it is judged that the position of the object $T_{f3}$ in the longitudinal direction is in the oncoming vehicle judging range $A_2$.

$$0 \leq d_{yf3} \leq d_{yf0} \quad (6)$$

Figure 10:
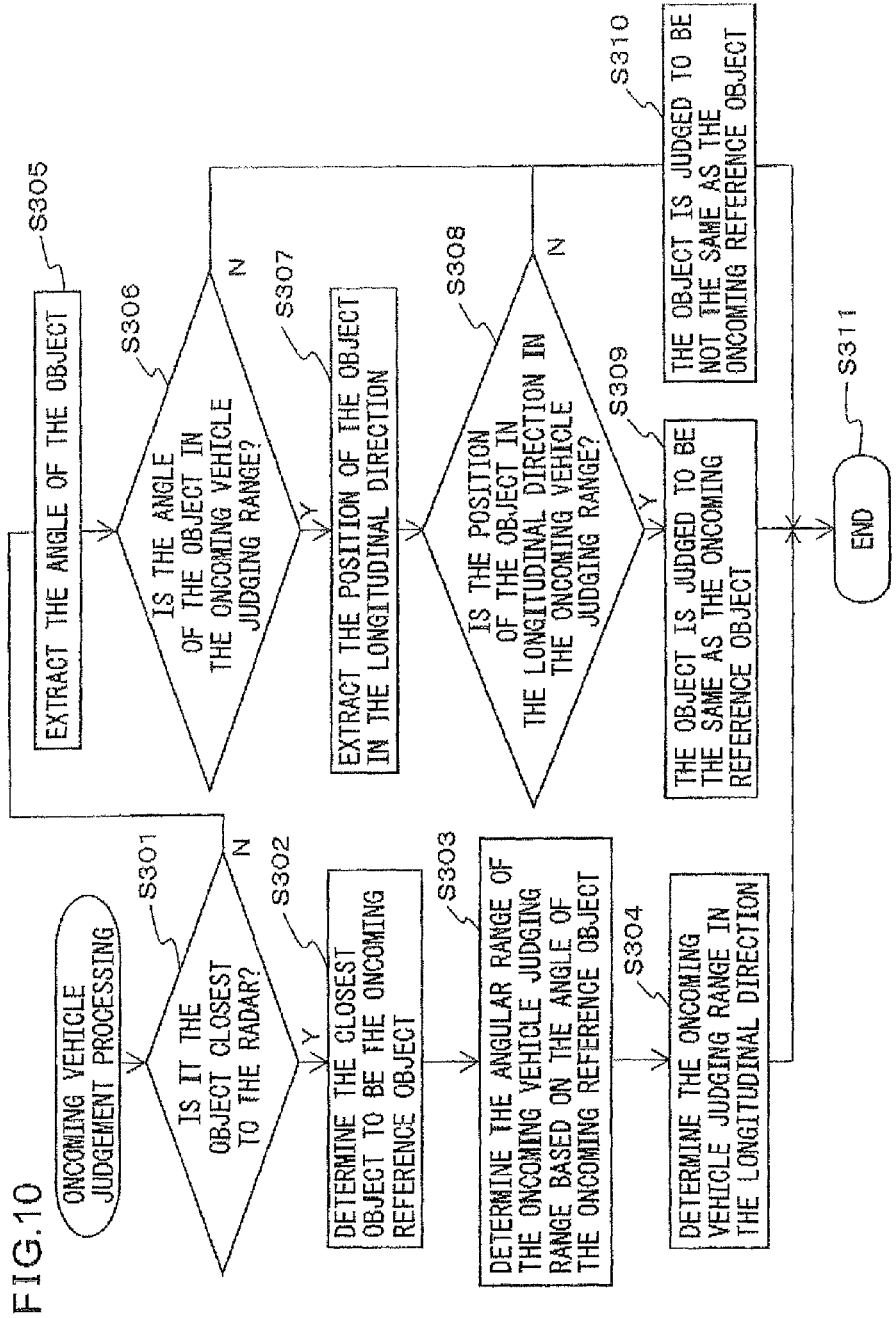
FIG. 10 is a flowchart illustrating a method of detecting the oncoming vehicle by using the radar device 10.

If the position $d_{yf3}$ of the object $T_{f3}$ in the longitudinal direction is in the oncoming vehicle judging range $A_2$, the side surface judging unit 39 at step S309 judges that the object $T_{f3}$ is the same as the oncoming reference object $T_{f1}$ and the oncoming vehicle judgment processing in FIG. 10 ends at step S311.

In the example shown in FIGS. 5 and 6, of the objects $T_{f2}$ and $T_{f3}$, the object $T_{f2}$ is present outside of the oncoming vehicle judging range $A_2$ and is judged to be an object separate from the object $T_{f1}$ which is the oncoming vehicle, while the object $T_{f3}$ is present in the oncoming vehicle judging range $A_2$ and is judged to be the object same as the object $T_{f1}$ which is the oncoming vehicle.

FIGS. 5 and 6 are showing the oncoming vehicle judging range $A_2$ set by the radar device 10 and the range $A_1'$ which is the conventional preceding vehicle judging range that is directly set on the side of the oncoming vehicles. If the object $T_{f2}$ is included in the range $A_1'$ which is the range of when the conventional preceding vehicle judging range is directly set on the side of the oncoming vehicles, the object $T_{f2}$ according to the conventional processing method is judged to be the same as the oncoming reference object $T_{f1}$ and cannot be detected. However, the object $T_{f2}$ is present outside the oncoming vehicle judging range $A_2$ that is set by the radar device 10, and can be detected as an object different from the oncoming reference object $T_{f1}$.

By using the radar device 10, as described above, the oncoming vehicle judging range for judging the identity of a plurality of oncoming vehicles is set to be narrower than the preceding vehicle judging range for judging the identity of a plurality of preceding vehicles. Therefore, if an object (oncoming object) is detected based on another oncoming vehicle which is not the oncoming vehicles that have been detected on the opposite lane, it does not happen that the another oncoming vehicle is incorrectly recognized to be the same as the oncoming vehicle that has been detected.

Figure 11:
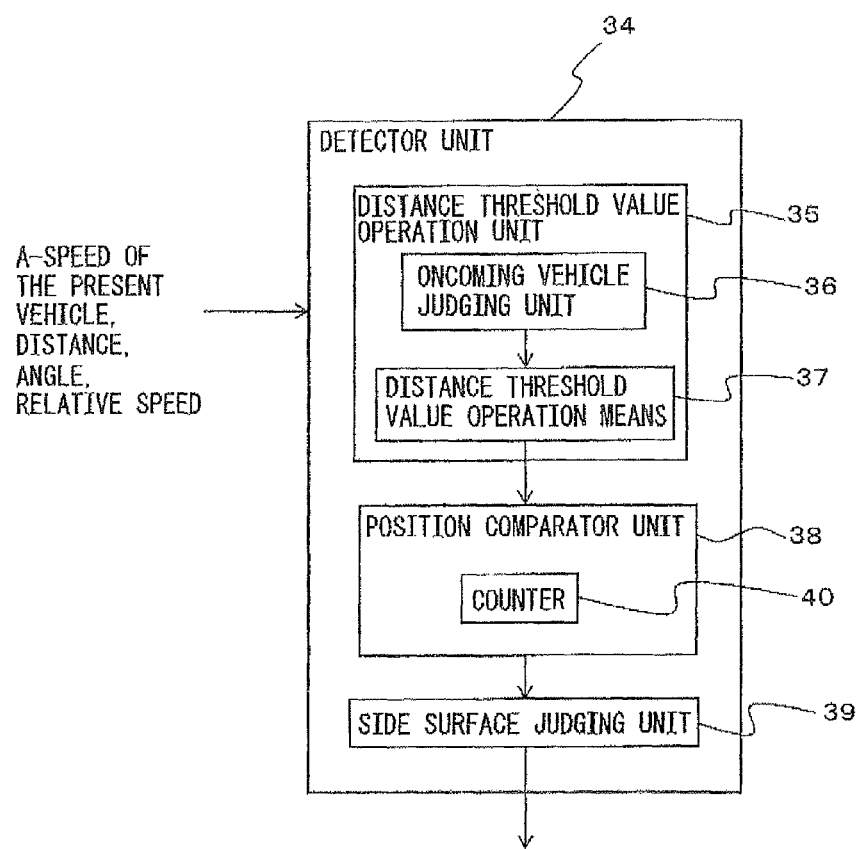
FIG. 11 is a diagram illustrating the constitution of a detector unit 340 of another radar device.
Figure 12:
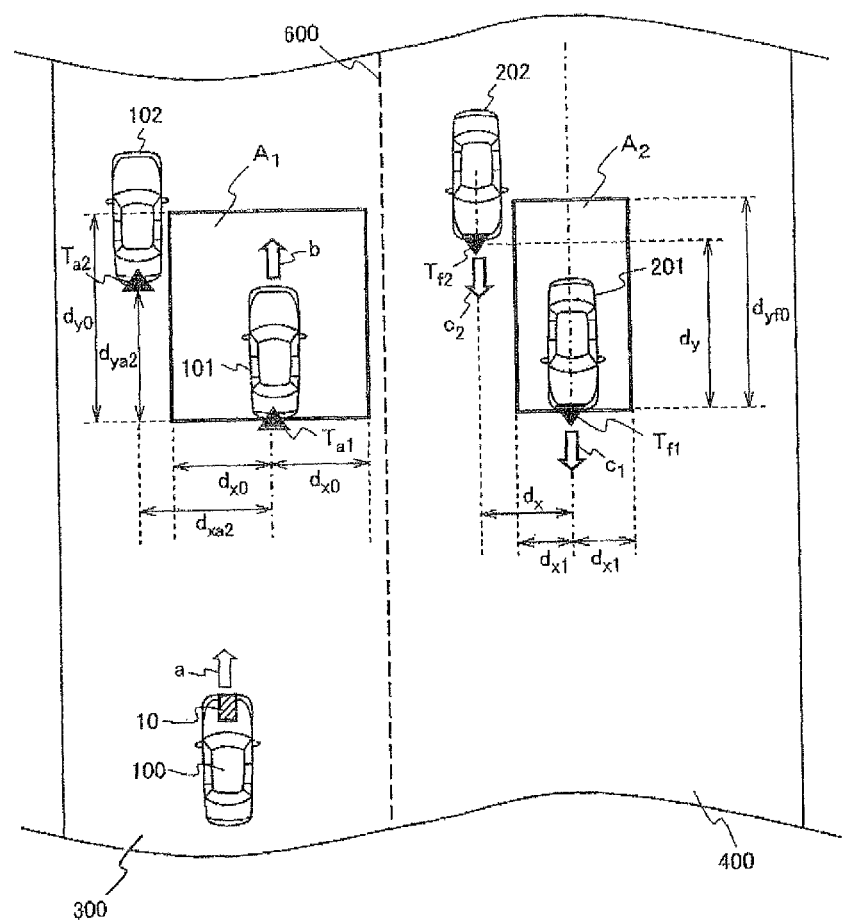
FIG. 12 is a view showing a scene for detecting oncoming vehicles traveling in parallel by using the another radar device 19.

Next, described below is a detector unit 340 of another radar device 19 (see FIG. 12). FIG. 11 is a diagram illustrating the constitution of the detector unit 340 of the another radar device 19. The detector unit 340 includes a distance threshold value operation unit 35, a position comparator unit 38 and a side surface judging unit 39. The distance threshold value operation unit 35 includes an oncoming vehicle judging unit 36 and a distance threshold value operation means 37. Further, the detector unit 340 of the another radar device 19 has a feature in that the position comparator unit 38 includes a counter 40. The constitution of the another radar device 19, except the detector unit 340, is the same as that of the above-mentioned radar device 10 and is not described here again in detail.

Next, described below is a method of detecting an object by using the another radar device 19. When the frequency that the detector unit 340 has detected the object traveling in the same direction as the present vehicle on outside of the preceding vehicle judging range, has exceeded a predetermined frequency of judging the preceding vehicle, the another radar device 19 judges that the object is not the same as the preceding reference object. When the frequency that the detector unit 340 has detected the object traveling in the direction to the present vehicle on outside of the oncoming vehicle judging range, has exceeded a predetermined frequency of judging the oncoming vehicle, the another radar device 19 judges that the object is not the same as the oncoming reference object. Namely, the feature of the another radar device 19 reside in that the frequency for judging the oncoming vehicle is set to be smaller than the frequency for judging the preceding vehicle.

To explain a method of detecting the preceding vehicle, described below is a positional relationship between the present vehicle and the preceding vehicle. FIG. 12 is a view looking down the traveling vehicles from the upper side. As shown in FIG. 12, it is presumed that a first preceding vehicle 101 and a second preceding vehicle 102 are traveling ahead of the present vehicle 100 that is mounting the radar device 19. It is, further, presumed that the preceding vehicle judging range $A_1$ is specified based on the position of the object $T_{a1}$ detected from the first preceding vehicle 101 which is at a position closest to the present vehicle 100.

Figure 13:
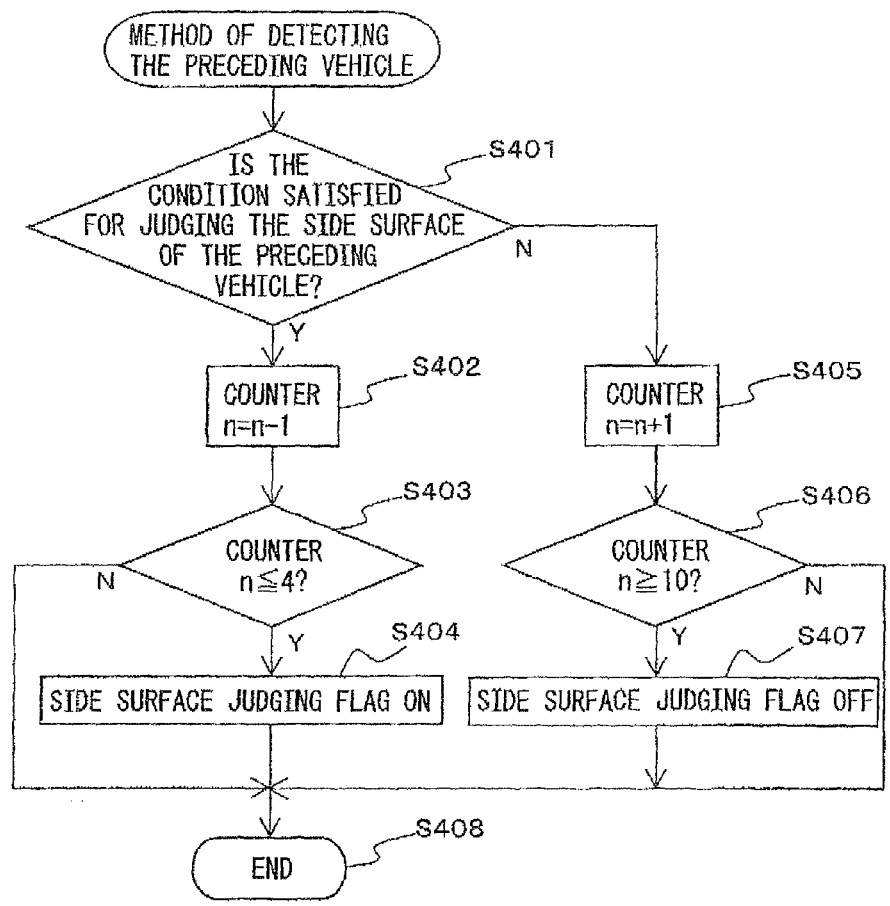
FIG. 13 is a flowchart illustrating a method of detecting the preceding vehicle by using the another radar device 19.

Described below is the method of detecting the preceding vehicle by using a flowchart of FIG. 13. The method of detecting the preceding vehicle is carried out by executing a program stored in a memory (not shown) in the detector unit 340. At step S401, first, the side surface judging unit 39 judges if the detected object is satisfying the condition for judging the side surface of the preceding vehicle. The "condition for judging the side surface of the preceding vehicle" stands for a condition in which the object is present in the preceding vehicle judging range $A_1$. If the object is presumed to be an object $T_{a2}$ which is detected from the second preceding vehicle 102, then the object $T_{a2}$ is not present in the preceding vehicle judging range $A_1$ as shown in FIG. 12. At step S405, therefore, the counter 40 increases a count number n by 1. The count number n is initially 0.

Next, at step S406, the side surface judging unit 39 judges if the count number n is 10 or more. If the count number is 10 or more, the side surface judging unit 39 judges at step S407 that the object $T_{a2}$ is not the same as the preceding reference object $T_{a1}$ and renders a side surface judging flag to be OFF. The "side surface judging flag" is a flag stating that the object is highly probably the same as the preceding reference object. The side surface judging flag is rendered at step S407 to be OFF. This is for not overturning the judgment once the object is judged to be not the same as the preceding reference object. If the count number n at step S406 is less than 10, on the other hand, the next detection is effected without rendering the side surface judging flag to be OFF.

At step S401, if the side surface judging unit 39 has judged that the object $T_{a2}$ is satisfying the condition for judging the side surface, the counter 40 at step S402 subtracts the count number n by 1. Next, at step S403, the side surface judging unit 39 judges if the count number n of the counter is 4 or less. If n is 4 or less, the side surface judging flag is rendered ON at step S404. The side surface judging flag is rendered ON because the object $T_{a2}$ is highly probably the same as the preceding reference object. If n is larger than 4, the next detection is effected without rendering the side surface judging flag to be ON and the method of detecting the preceding vehicle in FIG. 13 ends at step S408.

In judging the preceding vehicle as described above, if the object is detected 10 times on the outside of the preceding vehicle judging range, then it is judged that the object is not the same as the preceding reference object. Namely, when the frequency of detecting the object outside the preceding vehicle judging range exceeds the predetermined frequency (10 times) of judging the preceding vehicle, the detector unit 340 judge that the object is that of another preceding vehicle.

Next, described below is a positional relationship between the present vehicle and the oncoming vehicle to explain a method of detecting the oncoming vehicle. FIG. 12 is a view looking down the traveling vehicles from the upper side. As shown in FIG. 12, it is presumed that a first oncoming vehicle 201 and a second oncoming vehicle 202 are traveling on the opposite lane 400 ahead of the present vehicle 100 that is mounting the radar device 19. It is, further, presumed that the oncoming vehicle judging range $A_2$ is specified based on the position of the object $T\#_1$ detected from the first oncoming vehicle 201 which is at a position closest to the present vehicle 100.

Figure 14:
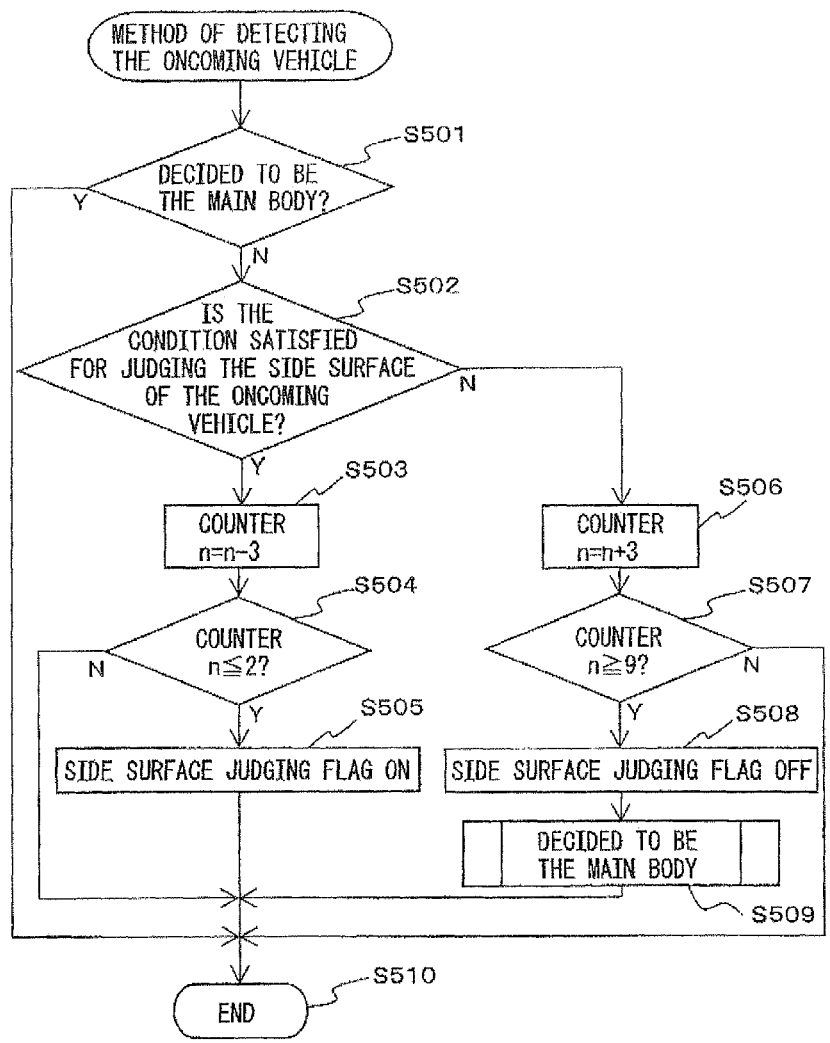
FIG. 14 is a flowchart illustrating a method of detecting the oncoming vehicle by using the another radar device 19.

Next, described below is the method of detecting the oncoming vehicle by using a flowchart of FIG. 14. The method of detecting the oncoming vehicle is carried out by executing a program stored in the memory (not shown) in the detector unit 340. At step S501, first, the side surface judging unit 39 judges if the object has been decided to be the main body. The expression "decided to be the main body" means that the object has already been decided in the past to be the same as the oncoming reference object. The data related to if the object has been decided to be the main body are stored in a memory as the data related to the objects. If the object has already been decided to be the main body, the judgment processing for judging the identity between the object and the oncoming reference object ends at step S510.

If the side surface judging unit 39 judges that the object has not been decided to be the main body, it is judged at step S502 if the detected object is satisfying the condition for judging the side surface of the oncoming vehicle. The "condition for judging the side surface of the oncoming vehicle" stands for a condition in which the object is present in the oncoming vehicle judging range $A_2$. If the object is an object $T_{f2}$ which is the second oncoming vehicle 202, the object $T_{f2}$ is not present in the oncoming vehicle judging range $A_2$ as shown in FIG. 12. At step S506, therefore, the counter increases the count number n by 3. The count number n is initially 0.

Next, at step S507, the side surface judging unit 39 judges if the count number n is 9 or more. If the count number is 9 or more, the side surface judging unit 39 judges at step S508 that the object $T_{f2}$ is not the same as the oncoming reference object $T_{f1}$ and renders the side surface judging flag to be OFF, and at step S509, the side surface judging unit 39 judges the object $T_{f2}$ has been decided to be the main body. The count number n is increased by 3 every time when the object $T_{f2}$ is detected in the oncoming vehicle judging range $A_2$. Therefore, the count number n becomes 9 or more if the object $T_{f2}$ is detected 3 times. The side surface judging flag is rendered at step S508 to be OFF. This is for not overturning the judgment once the object is judged to be not the same as the oncoming reference object. If the count number n at step S507 is less than 9, on the other hand, the next detection is effected without rendering the side surface judging flag to be OFF.

Figure 15:
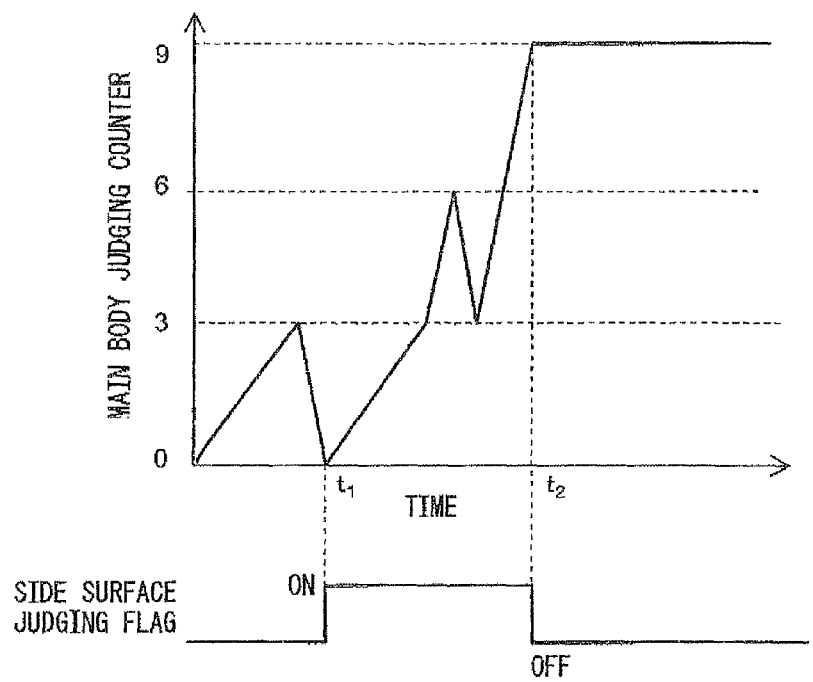
FIG. 15 is a diagram showing the count number of a counter 40 depending upon the time in the another radar device 19.

FIG. 15 shows an example of a change in the count number n of the counter 40 depending upon the time. As shown in FIG. 15, the side surface judging flag is rendered ON at a moment $t_1$ when the count number becomes n≤2 but, at a moment $t_2$ of n≥9, is decided to be the main body and is rendered OFF.

If the side surface judging unit 39 at step S502 judges that the object is satisfying the condition for judging the side surface of the oncoming vehicle, the counter 40 at step S503 subtracts 3 from the count number n. Next, at step S504, the side surface judging unit 39 judges if the count number n of the counter is 2 or less. If n is 2 or less, the side surface judging flag is rendered ON at step S505. The side surface judging flag is rendered ON. This is because the object is highly probably the same as the oncoming reference object.

In judging the oncoming vehicle as described above, the object is judged to be the another oncoming vehicle in case the object is detected three times outside the oncoming vehicle judging range. Namely, the detector unit 340 judges the object to be the one based on the another oncoming vehicle if the frequency of detecting the object outside the oncoming vehicle judging range exceeds the predetermined frequency (three times) of judging the oncoming vehicle.

Another radar device 19 transmits the electromagnetic waves a plurality of times maintaining a predetermined time interval. If the period in which the object is detected outside the oncoming vehicle judging range exceeds a predetermined oncoming vehicle judging period, then the oncoming vehicle judging period in which the detector unit 340 judges the object to be another oncoming vehicle becomes shorter than the preceding vehicle judging period in which the detector unit 340 judges the preceding object to be the another preceding vehicle of when the period in which the preceding object is detected outside the preceding vehicle judging range has exceeded the preceding vehicle judging period. According to the another radar device 19, therefore, the frequency of judging the oncoming vehicle is set to be smaller than the frequency of judging the preceding vehicle making it possible to detect the oncoming vehicle in a short period of time.

In the above description, the frequency of judging the preceding vehicle was set to be 10 times and the frequency of judging the oncoming vehicle was set to be 3 times. Not being limited thereto only, however, the time from when the object was first detected outside the oncoming vehicle judging range until when it was judged to be the oncoming vehicle may be set to be shorter than the time from when the preceding object was first detected outside the preceding vehicle judging range until when it was judged to be the preceding vehicle. The oncoming vehicle has a relative speed faster than that of the preceding speed and, therefore, the oncoming vehicle can be judged in a short period of time. This makes it possible to carry out the ACC or the CMBS more safely.

In the above description, the count number of the counter was increased when the object was detected outside the preceding vehicle judging range or outside the oncoming vehicle judging range. However, a constitution may be added which decreases the count number of the counter when the object is detected in the preceding vehicle judging range or in the oncoming vehicle judging range. In this case, even when the count number of the counter is incorrectly increased due to noise or the like, the count number of the counter is decreased and the erroneously judged result can be corrected.

Next, described below is another detection method by using the another radar device 19 (see FIG. 16). In the another detection method by using the another radar device 19, if the position of the object is outside a predetermined range for deciding the main body of the oncoming vehicle which is based on the position of the oncoming vehicle as a reference, the detector unit instantaneously judges the object to be different from the reference oncoming vehicle. Namely, the feature is that the predetermined range for deciding the main body of the oncoming vehicle is wider than the oncoming vehicle judging range. The detector unit 340 in the another radar device 19 is constituted in the same manner as the detector unit 340 of the above-mentioned radar device, and is not described in detail again.

The another operating method of the detector unit 340 of the another radar device 19 will be described below with reference to FIG. 16 which is a bird's-eye view looking down the first oncoming vehicle 201 and the second oncoming vehicle 202 traveling on the opposite lane 400. In FIG. 16, the second oncoming vehicle 202 is traveling behind the first oncoming vehicle 201, and is moving from 202 to 202'. FIG. 17 shows the results detected by the another detection method by using the another radar device 19.

The range $A_2'$ for deciding the main body of the oncoming vehicle and the oncoming vehicle judging range $A_2$ are specified based on the position of the object $T_{f1}$ of the first oncoming vehicle 201 as a reference. The oncoming vehicle judging range $A_2$ is specified in the same manner as that of using the radar device 10. The range $A_2'$ for deciding the main body of the oncoming vehicle covers a range of $\pm d_{x2}$ in the transverse direction with the position of the oncoming reference object $T_{f1}$ as a reference. For instance, the range $A_2'$ for deciding the main body of the oncoming vehicle has a width of $2d_{x2}=2.5$ [m] in the transverse direction. The terms $d_{x2}>d_{x1}$, and the range $A_2'$ for deciding the main body of the oncoming vehicle is wider than the oncoming vehicle judging range $A_2$ in the transverse direction. Similarly, the range $A_2'$ for deciding the main body of the oncoming vehicle in the longitudinal direction covers a range of $d_{y2}$ in the longitudinal direction with the position of the object $T_{f1}$ as a reference. The terms $d_{y2}>d_{y0}$, and the range $A_2'$ for deciding the main body of the oncoming vehicle is wider than the oncoming vehicle judging range $A_2$ in the longitudinal direction. Referring to FIG. 16, the position of the object $T_{f2}$ detected based on the second oncoming vehicle 202 is outside the oncoming vehicle judging range $A_2$ but is inside the range $A_2'$ for deciding the main body of the oncoming vehicle. Further, the position of the object $T_{f2}'$ detected when the second oncoming vehicle 202 has moved to the position 202', is outside the range $A_2'$ for deciding the main body of the oncoming vehicle.

Next, another method of detecting the object by using the another radar device 19 will be described with reference to a flowchart in FIG. 18. The method of detecting the object by using the another radar device 19 is carried out by executing a program stored in the memory (not shown) in the detector unit 340. The radar device 19 detects the object (oncoming vehicle) that is approaching the present vehicle. The method of judging if the detected object is approaching the present vehicle and the method of determining the object that serves as a reference for judging the identity to the object, are the same as the methods of using the radar device 10, and are not described here again in detail. Further, the method of setting the range $A_2'$ for deciding the main body of the oncoming vehicle and the oncoming vehicle judging range $A_2$ is the same as the detection method using the radar device 10 described with reference to steps S301 to S304 in FIG. 10, and is not described here again in detail.

First, described below is the method of detecting the second oncoming vehicle 202 shown in FIG. 16. The position comparator unit 38 at step S601 extracts the angle of the object to be detected from the memory (not shown) storing the data in advance (see S102 in FIG. 7) and at step S602 judges if the angle of the object $T_{f2}$ detected from the second oncoming vehicle 202 is in the angular range of the oncoming vehicle judging range $A_2$. As shown in FIG. 17, the angular range of the oncoming vehicle judging range $A_2$ is set to be from $(\theta_1-d\theta_{f1}/2)$ to $(\theta_1+d\theta_{f1}/2)$ with the angle $\theta_1$ of the reference object $T_{f1}$ detected from the first oncoming vehicle 201 as a reference. If the angle of the object $T_{f2}$ is calculated to be $\theta_{f2}$, then $\theta_{f2}<\theta_1-d\theta_{f1}/2$ as shown in FIG. 17, and the angle of the object $T_{f2}$ is judged to be outside the angular range of the oncoming vehicle judging range $A_2$.

Next, at step S606, the position comparator unit 38 judges if the angle of the object $T_{f2}$ is in the range $A_2'$ for deciding the main body of the oncoming vehicle. The angular range of the range $A_2'$ for deciding the main body of the oncoming vehicle is set to be from $(\theta_1-d\theta_{f2}/2)$ to $(\theta_1+d\theta_{f2}/2)$. Referring to FIG. 17, if the angle of the object $T_{f2}$ is calculated to be $\theta_{f2}$, then $\theta_1-d\theta_{f2}/2 \leq \theta_{f2} \leq \theta_1+d\theta_{f2}/2$, and the angle $\theta_{f2}$ of the object $T_{f2}$ is judged to be in the angular range of the range $A_2'$ for deciding the main body of the oncoming vehicle.

Next, at step S607, the position comparator unit 38 judges if the position of the object $T_{f2}$ in the longitudinal direction is in the range $A_2'$ for deciding the main body of the oncoming vehicle. The range $A_2'$ for deciding the main body of the oncoming vehicle in the longitudinal direction is set to cover a range of 0 to $d_{y2}$. If the position of the object $T_{f2}$ in the longitudinal direction is calculated to be $d_{yf2}$ as shown in FIG. 17, then $0 \leq d_{yf2} \leq d_{y2}$, and the position $d_{yf2}$ of the object $T_{f2}$ in the longitudinal direction is judged to be present in the range $A_2'$ for deciding the main body of the oncoming vehicle.

In this case, at step S608, the identity to the object used as the reference is judged based on the period of detection. That is, the identity of the oncoming reference object is not instantaneously judged but the identity of the oncoming reference object is judged by setting a predetermined period like the above-mentioned detection method by using the another radar device.

Figure 16:
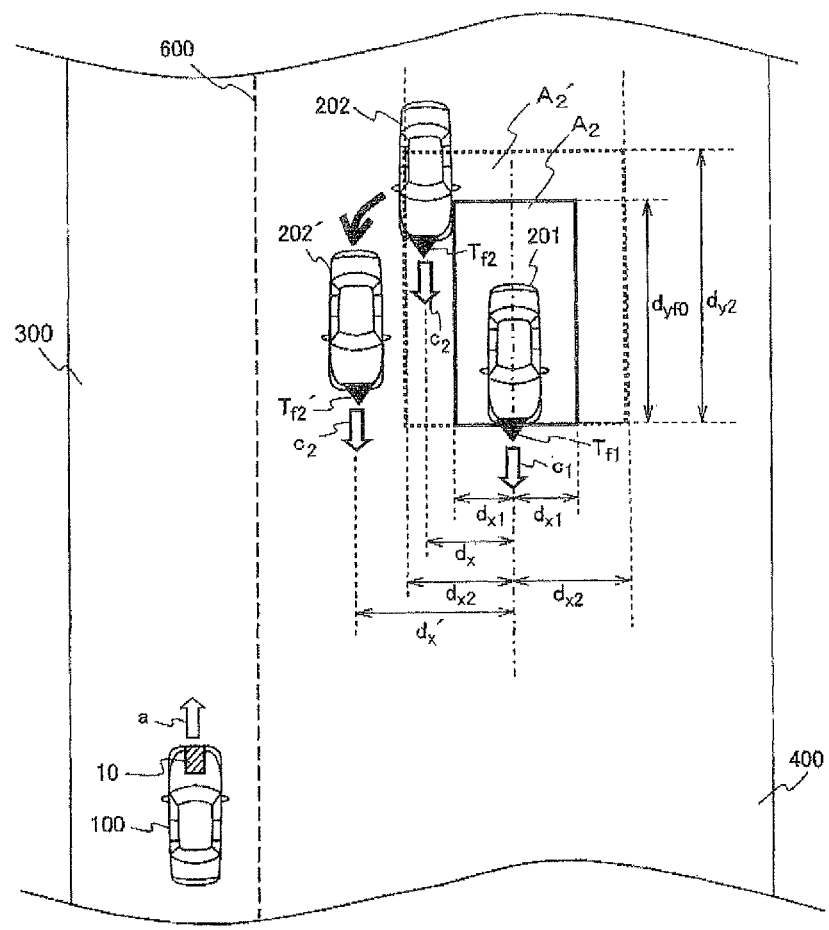
FIG. 16 is a view showing a scene for detecting the oncoming vehicles traveling in parallel by using the another radar device 19.
Figure 17:
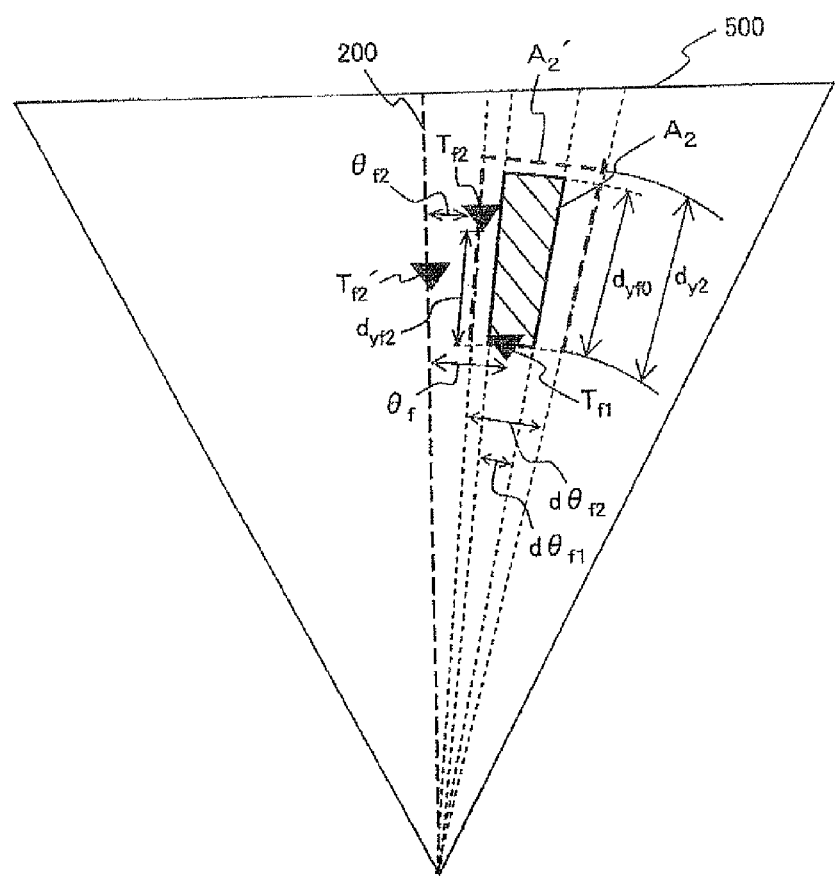
FIG. 17 is a view showing the results of when the oncoming vehicles traveling in parallel are detected by the another radar device 19.

Next, described below is a detection method of when the second oncoming vehicle 202 has moved to a position 202' as shown in FIG. 16. In this case, the detected object is denoted by $T_{f2}'$. In the flowchart of FIG. 18, it is judged if the object $T_{f2}'$ is present in the oncoming vehicle judging range $A_2$ through steps S601 to S605 in the flowchart of FIG. 18 like the above-mentioned case of the second oncoming vehicle 202. In the another detection method using the another radar device 19 as shown in FIGS. 16 and 17, the object $T_{f2}'$ is not present in the oncoming vehicle judging range $A_2$. Therefore, it is judged if the position of the object $T_{f2}'$ is in the range $A_2'$ for deciding the main body of the oncoming vehicle.

At step S606, the position comparator unit 38 judges if the angle of the object $T_{f2}'$ is in the angular range of the range $A_2'$ for deciding the main body of the oncoming vehicle. The object $T_{f2}'$ is present outside the range $A_2'$ for deciding the main body of the oncoming vehicle. Therefore, the position comparator unit 38 at step S609 instantaneously judges that the object $T_{f2}'$ is not the same as the oncoming reference object $T_{f1}$ and the method of detecting the main body of the oncoming vehicle in FIG. 18 ends at step S610.

According to the another detection method using the another radar device 19 as described above, the range for deciding the main body of the oncoming vehicle is specified making it possible to quickly detect the oncoming vehicle that is approaching and to enhance the capability of avoiding collision with the oncoming vehicle.

In the above description, the object stemming from another vehicle is instantaneously judged to be the another oncoming vehicle when it is detected outside the range for deciding the main body of the oncoming vehicle. The object, however, may be judged to be the another oncoming vehicle after the passage of a predetermined period of time in which the object was detected outside the range for deciding the main body of the oncoming vehicle. In this case, a counter may be provided in the detector unit 340, and the object may be judged to be the another vehicle when a predetermined value is exceeded by the count number of the counter that counts the number every time when the object is detected outside the range for deciding the main body of the oncoming vehicle.

The above embodiments have employed mechanical scanning radar device system. The invention, however, can also be embodied by employing an electronic scanning system.

What is claimed is:

1. A radar device mountable on a present vehicle, the radar device comprising:
   a transmission antenna configured to transmit electromagnetic waves to an object;
   a reception antenna configured to receive waves reflected by said object;
   a detector configured to detect, based on said reflected waves:
      positions of a preceding vehicle and a preceding object traveling in the same direction as the present vehicle, and
      positions of an oncoming vehicle and an oncoming object traveling in a direction opposite to the direction in which said present vehicle is traveling; and
   a position comparator configured to:
      judge said preceding object to be the same as said preceding vehicle if the position of said preceding object is in a predetermined preceding vehicle judging range that is determined using the position of said preceding vehicle as a reference, and
      judge said oncoming object to be the same as said oncoming vehicle if the position of said oncoming object is in a predetermined oncoming vehicle judging range that is determined using the position of said oncoming vehicle as a reference,
   wherein said oncoming vehicle judging range is set to be narrower than said preceding vehicle judging range so as not to incorrectly recognize said oncoming object as said oncoming vehicle.

2. The radar device according to claim 1, wherein:
   said detector is further configured to:
      judge said preceding object to be another preceding vehicle if a period in which said preceding object is detected outside said preceding vehicle judging range exceeds a predetermined preceding vehicle judging period, and
      judge said oncoming object to be another oncoming vehicle if a period in which said oncoming object is detected outside said oncoming vehicle judging range exceeds a predetermined oncoming vehicle judging period; and
   said oncoming vehicle judging period is set to be shorter than said preceding vehicle judging period.

3. The radar device according to claim 1, wherein:
   said radar device is configured to transmit electromagnetic waves a plurality of times from said transmission antenna;
   said detector is further configured to:
      judge said preceding object to be another preceding vehicle if a frequency of detecting said preceding object outside said preceding vehicle judging range exceeds a predetermined frequency of judging the preceding vehicle, and
      judge said oncoming object to be another oncoming vehicle if a frequency of detecting said oncoming object outside said oncoming vehicle judging range exceeds a predetermined frequency of judging the oncoming vehicle; and
   said frequency of judging the oncoming vehicle is set to be smaller than said frequency of judging the preceding vehicle.

4. The radar device according to claim 1, wherein:
   said detector is further configured to instantaneously judge said oncoming object to be another oncoming vehicle if the position of said oncoming object is outside a predetermined range for deciding the oncoming vehicle as a main body with the position of said oncoming vehicle as a reference, and said predetermined range for deciding the oncoming vehicle as the main body is wider than said oncoming vehicle judging range.

* * * * *